(12) United States Patent
Fukumoto et al.

(10) Patent No.: US 11,571,822 B2
(45) Date of Patent: Feb. 7, 2023

(54) CONTROL DEVICE, GREASE COOLING METHOD AND MANAGEMENT DEVICE

(71) Applicant: FANUC CORPORATION, Yamanashi (JP)

(72) Inventors: Yuuki Fukumoto, Yamanashi-ken (JP); Shuntaro Toda, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 858 days.

(21) Appl. No.: 16/530,048

(22) Filed: Aug. 2, 2019

(65) Prior Publication Data

US 2020/0047355 A1 Feb. 13, 2020

(30) Foreign Application Priority Data

Aug. 9, 2018 (JP) .............................. JP2018-150463
Apr. 22, 2019 (JP) .............................. JP2019-080890

(51) Int. Cl.
*B25J 19/00* (2006.01)
*B25J 9/16* (2006.01)

(52) U.S. Cl.
CPC ......... *B25J 19/0054* (2013.01); *B25J 9/1674* (2013.01); *B25J 19/0062* (2013.01)

(58) Field of Classification Search
CPC ... B25J 9/1674; B25J 19/0054; B25J 19/0062
See application file for complete search history.

(56) References Cited

U.S. PATENT DOCUMENTS

| 3,555,356 A | * | 1/1971 | Kaiser ..................... H02H 7/085 |
| | | | 318/473 |
| 2015/0327396 A1 | * | 11/2015 | Hahakura ................ B25J 9/044 |
| | | | 901/49 |
| 2017/0341223 A1 | * | 11/2017 | Hahakura ................ B25J 9/044 |
| 2018/0252362 A1 | * | 9/2018 | Guo ......................... F16N 29/04 |

FOREIGN PATENT DOCUMENTS

| DE | 102004056861 A1 | 6/2006 |
| DE | 112013002681 T5 | 3/2015 |
| EP | 1959532 A1 | 8/2008 |
| JP | H08126369 A | 5/1996 |
| JP | 2006181648 A | 7/2006 |

(Continued)

*Primary Examiner* — William C Joyce
(74) *Attorney, Agent, or Firm* — Robert P. Michal, Esq.; Carter, DeLuca & Farrell LLP

(57) ABSTRACT

A control device configured to control a robot including an articulated arm having a plurality of joints each provided with a motor and turned by driving of the motor and a base supporting the articulated arm includes: a temperature information obtaining unit configured to obtain temperature information about the plurality of joints; a joint specifying unit configured to specify one of the joints that requires cooling, based on the obtained temperature information about the plurality of joints; and a motor control unit configured to control the motor of each of the plurality of joints, wherein, when the joint specifying unit specifies one of the joints, the motor control unit controls the motor of at least one of the joints that is located on a side closer to the base from the specified joint so as to turn the joint on the base side for a given time.

24 Claims, 6 Drawing Sheets

(56) References Cited

FOREIGN PATENT DOCUMENTS

| | | | |
|---|---|---|---|
| JP | 2013126703 | A | 6/2013 |
| JP | 2014030866 | A | 2/2014 |
| JP | 2015182182 | A | 10/2015 |
| JP | 2017087320 | A | 5/2017 |
| JP | 2017516673 | A | 6/2017 |
| JP | 6370971 | B1 | 8/2018 |

* cited by examiner

CONTROL DEVICE, GREASE COOLING METHOD AND MANAGEMENT DEVICE

CROSS-REFERENCE TO RELATED APPLICATIONS

This application is based upon and claims the benefit of priority from Japanese Patent Applications No. 2018-150463 filed on Aug. 9, 2018 and No. 2019-080890 filed on Apr. 22, 2019, the contents all of which are incorporated herein by reference.

BACKGROUND OF THE INVENTION

Field of the Invention

The present invention relates to a control device, a grease cooling method, and a management device.

Description of the Related Art

While grease is used to lubricate the driving of motors at joints of robots, the degree of its deterioration progresses faster at higher temperatures. In order to suppress the deterioration of grease, Japanese Laid-Open Patent Publication No. 2015-182182 discloses an invention in which a motor is provided with cooling means.

SUMMARY OF THE INVENTION

However, providing a motor with cooling means results in an increased cost and may require enlarging the motor size for the cooling means.

An object of the present invention is to provide a control device, a grease cooling method, and a management device that suppress the deterioration of grease with a simple structure.

A first aspect of the present invention is directed to a control device configured to control a robot including an articulated arm having a plurality of joints each provided with a motor and turned by driving of the motor, and a base supporting the articulated arm. The control device includes: a temperature information obtaining unit configured to obtain temperature information about each of the plurality of joints; a joint specifying unit configured to specify one of the joints that requires cooling, based on the obtained temperature information about each of the plurality of joints; and a motor control unit configured to control the motor of each of the plurality of joints, wherein, when the joint specifying unit specifies one of the joints, the motor control unit is configured to control the motor of at least one of the joints that is located on a side of the base from the specified joint so as to turn the joint on the side of the base from the specified joint for a given time.

A second aspect of the present invention is directed to a grease cooling method executed by a control device configured to control a robot including an articulated arm having a plurality of joints each provided with a motor and turned by driving of the motor, and a base supporting the articulated arm. The grease cooling method includes: a temperature information obtaining step of obtaining temperature information about each of the plurality of joints; a joint specifying step of specifying one of the joints that requires cooling, based on the obtained temperature information about each of the plurality of joints; and a motor control step of, when the joint specifying step specifies one of the joints, controlling the motor of at least one of the joints that is located on a side of the base from the specified joint so as to turn the joint on the side of the base from the specified joint for a given time.

A third aspect of the present invention is directed to a management device configured to manage a plurality of robots each including an articulated arm having a plurality of joints each provided with a motor and turned by driving of the motor, and a base supporting the articulated arm. The management device includes: a temperature information obtaining unit configured to, for each of the plurality of robots, obtain temperature information about each of the plurality of joints; a joint specifying unit configured to, for each of the plurality of robots, specify one of the joints that requires cooling, based on the obtained temperature information about each of the plurality of joints; and a motor control unit configured to, for each of the plurality of robots, control the motor of each of the plurality of joints, wherein, when the joint specifying unit specifies one of the joints that requires cooling, the motor control unit is configured to control the motor of at least one of the joints of the robot that is located on a side of the base from the specified joint so as to turn the joint on the side of the base from the specified joint of the robot for a given time.

According to the present invention, it is possible to suppress the deterioration of grease with a simple structure.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

The control device, grease cooling method, and management device according to the present invention will now be described in detail while referring to the accompanying drawings in conjunction with preferred embodiments.

Embodiment

Figure 1:
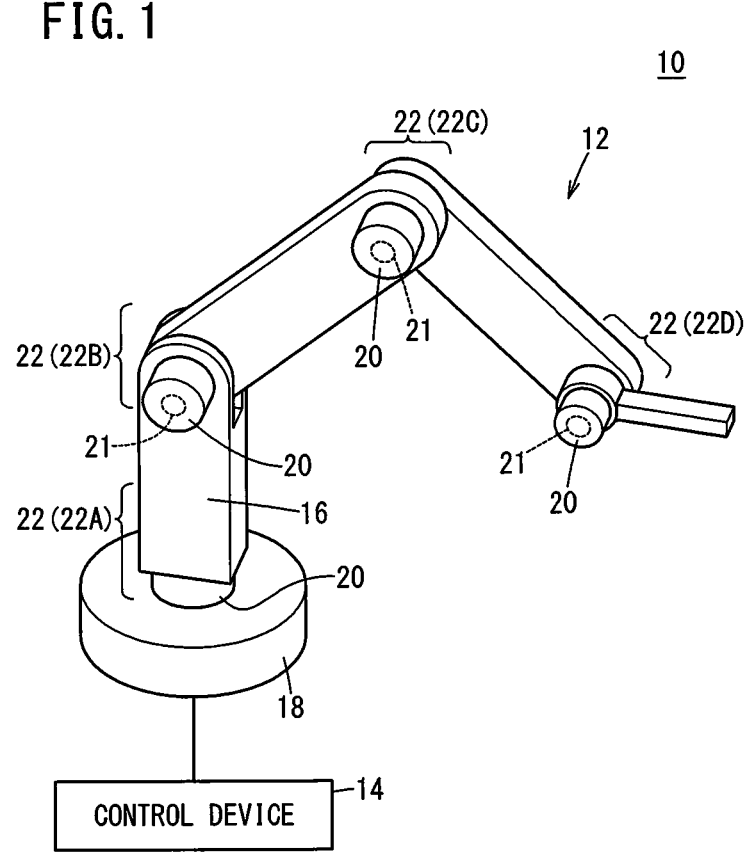
FIG. 1 is a diagram illustrating the schematic structure of a robot control system according to an embodiment.

FIG. 1 is a diagram illustrating the schematic structure of a robot control system 10 according to this embodiment. The robot control system 10 includes a robot 12, a control device 14 for controlling the robot 12, and so on.

The robot 12 includes an articulated arm 16, a base 18 for supporting the articulated arm 16, and so on. The articulated arm 16 includes a plurality of joints 22 that are turned by driving of motors 20. The control device 14 drives the motors 20 as needed to turn the joints 22.

Each joint 22 includes the motor 20, a reducer (not shown), a bearing (not shown), grease (a lubricant: not shown) for lubricating operation of the bearing, and so on. The motors 20 are capable of forward rotation and reverse rotation, and they transfer power to the reducers to turn the joints 22. Each motor 20 includes an encoder 21 for measuring a rotational position, and so on. The joints 22 of the articulated arm 16 are denoted as joint 22A, joint 22B, joint 22C, and joint 22D in order from the base 18.

The temperature of the grease increases as the motor 20 is driven, and the increased temperature increases the degree of deterioration. Also, the deterioration of grease increases the degree of wear of the bearing.

Figure 2:
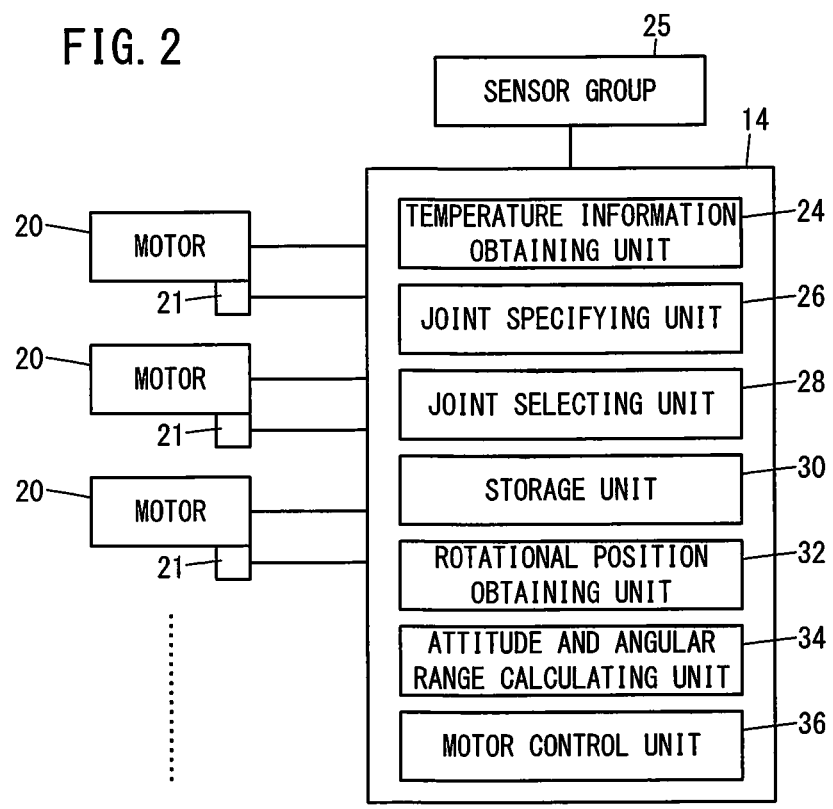
FIG. 2 is a diagram illustrating functional blocks of a control device of the embodiment.

The control device 14 performs a process for lowering increased grease temperature. FIG. 2 is a diagram illustrating functional blocks of the control device 14 according to this embodiment. In order to cool the grease at or over a given temperature, the control device 14 includes a temperature information obtaining unit 24, a sensor group 25, a joint specifying unit 26, a joint selecting unit 28, a storage unit 30, a rotational position obtaining unit 32, an attitude and angular range calculating unit 34, a motor control unit 36, etc.

The temperature information obtaining unit 24 obtains temperatures of the joints 22 by calculation, for example. The temperatures of the joints 22 include temperatures of the motors 20 etc. The temperatures of the joints 22 and the temperatures of the grease are correlated, where an increased temperature of a joint 22 indicates an increased temperature of the grease. Accordingly, in this embodiment, the temperature information obtaining unit 24 is configured to obtain a temperature of a joint 22 and estimate a temperature rise of the grease from the temperature rise of the joint 22. In the following processing, the temperature information obtaining unit 24 calculates and employs the temperatures of the joints 22, but it may directly obtain the temperatures of the grease.

The temperature information obtaining unit 24 obtains various kinds of information for obtaining the temperatures of the joints 22 from various kinds of sensors in the sensor group 25. For example, the information includes information about room temperature $T_0$ of the place where the robot 12 is provided, information about current value $I_M$ of the motor 20, information about rotational speed $S_M$ of the motor 20, information about friction torque T of the motor 20, and information about speed SR of movement of the joint 22 caused as the attitude of the articulated arm 16 changes, for example.

The temperature information obtaining unit 24 calculates the amount of heat generation from the motor 20 by using the current value $I_M$, rotational speed $S_M$, and so on. The temperature information obtaining unit 24 calculates the amount of heat generation due to friction by using the rotational speed $S_M$, friction torque T, and so on. The temperature information obtaining unit 24 calculates the amount of air-cooling heat radiation by using the speed SR and so on. The temperature information obtaining unit 24 obtains the temperatures of the joints 22 through calculation using the amount of heat generation from the motors 20, the amount of heat generation by friction, the amount of air-cooling heat radiation, and so on. The information indicating the temperatures of the joints 22 may be referred to also as temperature information. The temperature information may include information indicating the temperatures of the grease, information indicating the temperatures of the motors 20, etc.

The temperature information obtaining unit 24 may directly obtain the temperatures of the joints 22, the temperatures of the motors 20, or the temperatures of the grease from temperature sensors provided to the joints 22, instead of obtaining the temperature information in the manner described above.

On the basis of the temperature information obtained by the temperature information obtaining unit 24, the joint specifying unit 26 specifies any of the joints 22 at or over a given temperature that requires cooling.

The joint selecting unit 28 selects a joint or joints 22 that are located on the side closer to the base 18 from the joint 22 that was specified by the joint specifying unit 26. For example, if a plurality of joints 22 are present on the side closer to the base 18 from the joint 22 specified by the joint specifying unit 26, then the joint selecting unit 28 selects at least one joint 22 from among them. This selecting process may be designed to select one joint 22 or to select a plurality of joints 22. Also, this selecting process may be designed to select joints 22 at random, to select a joint 22 other than the joint 22 that was selected last time, or to select joints 22 in order.

Referring to FIG. 1, if the joint 22C is specified by the joint specifying unit 26, for example, then the joint selecting unit 28 selects at least one of the joint 22A and joint 22B.

The joint selecting unit 28 may be configured to select a joint 22 based on the degree of deterioration of the grease, for example. From among the joints 22 located on the side of the base 18 from the joint 22 specified by the joint specifying unit 26, the joint selecting unit 28 may select a joint 22 that includes grease whose deterioration degree is less than a reference value, or a joint 22 that includes grease whose deterioration degree is the lowest, or a joint 22 that includes grease whose deterioration degree is less than a reference value and the lowest, for example. In this case, the joint selecting unit 28 may calculate the deterioration degree of the grease based on an operating time, rotational speed, etc. of the motor 20 of the joint 22 that includes the grease.

The storage unit 30 stores information indicating an operation permitted area (motion permitted area) of the articulated arm 16. The operation permitted area is an area of a range where the articulated arm 16 is permitted to operate. For example, if an interfering object is placed around the robot 12, the operation permitted area is an area of a range within which the articulated arm 16 does not interfere with the interfering object.

The rotational position obtaining unit 32 obtains information indicating a rotational position of each motor 20 from the encoder 21 provided to each motor 20.

From the information indicating the rotational position of each motor 20 obtained by the rotational position obtaining unit 32, the attitude and angular range calculating unit 34 calculates information indicating an attitude of the articulated arm 16.

On the basis of the information indicating the operation permitted area and the information indicating the attitude, the attitude and angular range calculating unit 34 calculates a range of rotational angle of the motor 20 of the joint 22 selected by the joint selecting unit 28 such that the articulated arm 16 will not operate outside of the operation permitted area.

The motor control unit 36 drives and rotates the motor 20 of the joint 22 selected by the joint selecting unit 28 for a given time period within the range of rotational angle calculated by the attitude and angular range calculating unit 34. Thus, the joint 22 specified by the joint specifying unit 26 is aired for the given time. The grease included in the joint 22 specified by the joint specifying unit 26 is thus cooled. The given time may be uniformly determined for all motors 20, or may differ according to the rotational speed etc. of each motor 20. The given time may also be varied according to the temperature of the specified joint 22.

The motor control unit 36 may prohibit driving of the motor 20 of the joint 22 that was specified by the joint specifying unit 26 for the given time during which the motor 20 of the joint 22 that was selected by the joint selecting unit 28 is being driven. This suppresses temperature rise of the grease of the joint 22 specified by the joint specifying unit 26.

The control device 14 may be composed of a processor such as a CPU (Central Processing Unit) or MPU (Micro Processing Unit), a memory such as a ROM (Read Only Memory) and RAM (Random Access Memory), various kinds of interfaces for obtaining information on temperature etc. and for controlling the motors 20, and so on. The memory realizes the function of the storage unit 30. The processor executes processes using programs and various kinds of information stored in the memory to realize the functions of the temperature information obtaining unit 24, joint specifying unit 26, joint selecting unit 28, rotational position obtaining unit 32, attitude and angular range calculating unit 34, and motor control unit 36.

Figure 3:
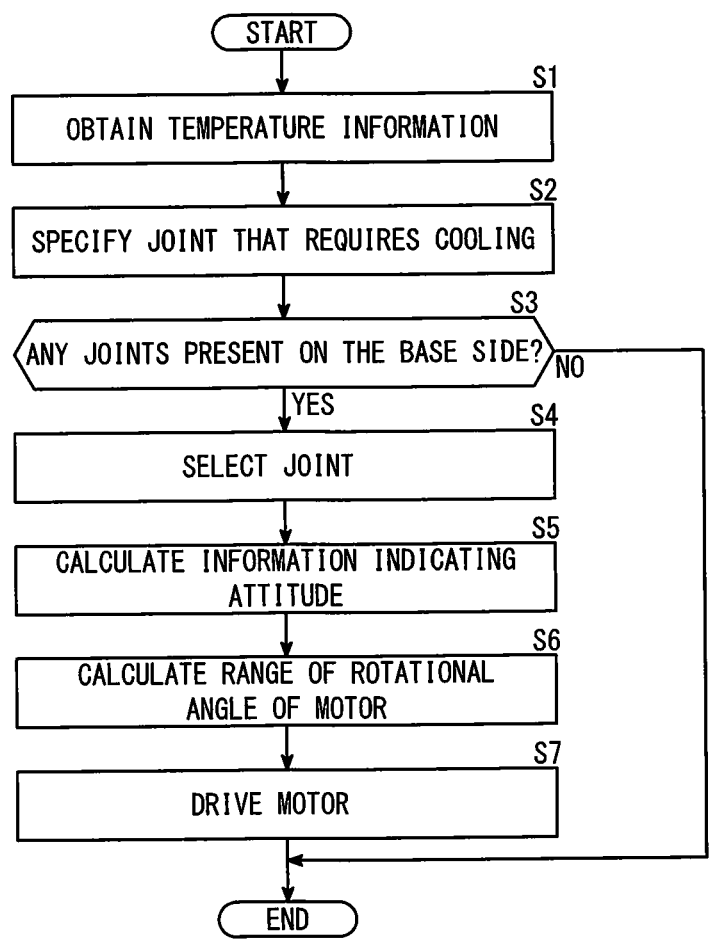
FIG. 3 is a flowchart showing an example of a grease cooling process according to the embodiment.

Operations of the control device 14 of this embodiment will now be described referring to the flowchart of FIG. 3. At step S1, the temperature information obtaining unit 24 obtains the temperature information on the joints 22. At step S2, based on the temperature information obtained at step S1, the joint specifying unit 26 specifies a joint 22 that includes grease that requires cooling.

At step S3, the joint selecting unit 28 determines whether any joint 22 exists on the side closer to the base 18 from the joint 22 specified at step S2. If no joint 22 is present on the side of the base 18 from the specified joint 22 (step S3: NO), then the grease cooling process of the control device 14 ends.

If any joint 22 exists on the side of the base 18 from the specified joint 22 (step S3: YES), then at step S4, the joint selecting unit 28 selects at least one joint 22 that is located on the side of the base 18 from the joint 22 specified by the joint specifying unit 26.

At step S5, the attitude and angular range calculating unit 34 calculates information indicating the attitude of the articulated arm 16 from the rotational position of each motor 20 obtained by the rotational position obtaining unit 32.

At step S6, the attitude and angular range calculating unit 34 calculates the range of rotational angle of the motor 20 of the joint 22 selected by the joint selecting unit 28, based on the information indicating the operation permitted area and the information indicating the attitude.

At step S7, the motor control unit 36 controls the motor 20 of the joint 22 selected by the joint selecting unit 28 to rotate it for the given time within the range of rotational angle calculated by the attitude and angular range calculating unit 34.

According to the control device 14 of this embodiment, a joint 22 located on the side closer to the base 18 from a high-temperature joint 22 is turned to air the high-temperature joint 22 to cool that joint 22, without providing each of the plurality of joints 22 with a cooling device or the like. It is thus possible to cool the grease included in the high-temperature joint 22 so as to suppress deterioration of the grease.

Further, according to the control device 14 of this embodiment, the degree of deterioration of the grease is calculated, and a joint 22 that includes grease whose calculated deterioration degree is less than a reference value and/or is the smallest is selected and turned, whereby the deterioration of grease of the joints 22 is suppressed.

Further, according to the control device 14 of this embodiment, when an interfering object is present around the robot 12, for example, information indicating the attitude of the robot 12 is calculated and then each motor 20 is rotated within a range of rotational angle that is calculated based on the information indicating the operation permitted area and the information indicating the attitude, so as to prevent interference between the articulated arm 16 and interfering objects.

Modifications

Modifications as shown below may be applied to the embodiment above.

[First Modification]

Figure 4:
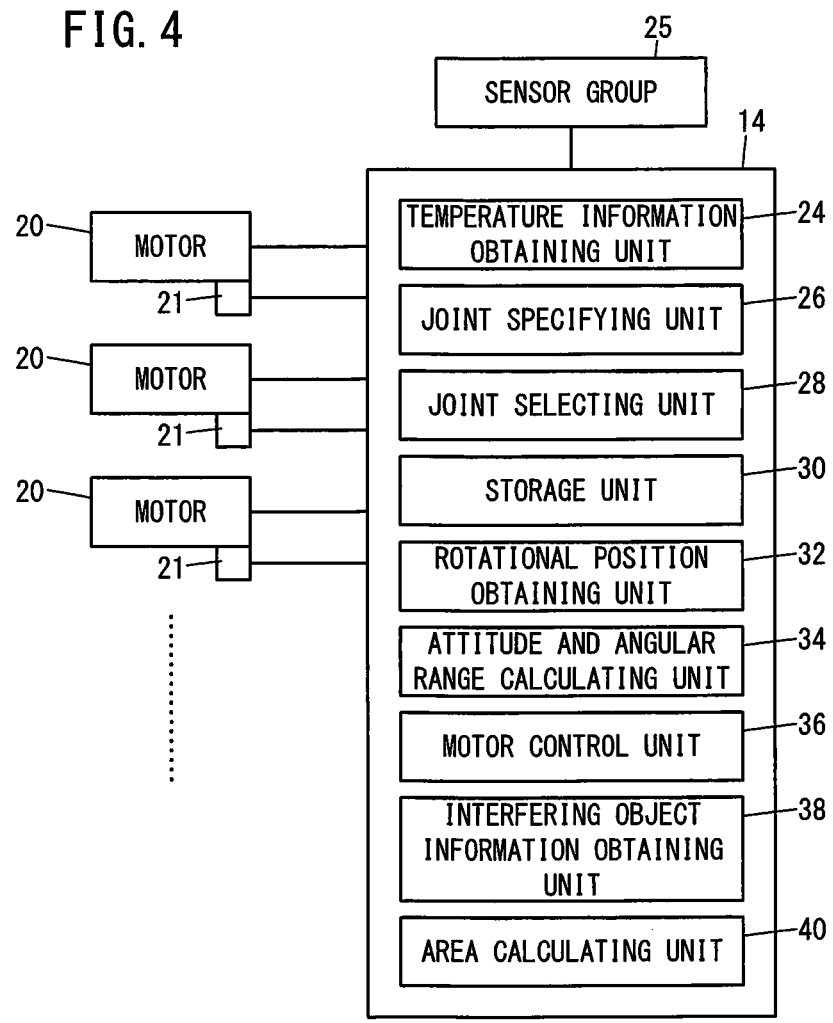
FIG. 4 is a diagram illustrating functional blocks of a control device according to a modification.

In the embodiment above, the information indicating the operation permitted area is predetermined. However, if a new interfering object, which was not there before, is placed around the robot 12, for example, the operation permitted area changes and interference may occur between the articulated arm 16 and the interfering object. In order to prevent such interference, as shown in FIG. 4, a control device 14 of this modification further includes an interfering object information obtaining unit 38, an area calculating unit 40, etc. The same constituent elements as those of the control device 14 of the embodiment above are labeled using the same reference numerals and different constituent elements will be described below.

The interfering object information obtaining unit 38 is configured to obtain interfering object information indicating the size, position, shape, etc. of an interfering object present around the robot 12, from cameras etc. (not shown) provided to the robot 12, around the robot 12, on the ceiling above the robot 12, and the like.

The area calculating unit 40 calculates information indicating the operation permitted area based on the interfering object information. The area calculating unit 40 stores the calculated operation permitted area in the storage unit 30.

According to the control device 14 of this modification, it is possible to cool grease while preventing interference etc. according to variation of conditions around the robot 12.

(Second Modification)

The control device 14 of the first modification above includes the one area calculating unit 40 and it calculates information indicating an operation permitted area. However, if the single area calculating unit 40 calculates wrong information about the operation permitted area, then interference may occur between the articulated arm 16 and the interfering object. A control device 14 of this modification prevents interference between the articulated arm 16 and interfering object if a problem occurs in the calculation of information indicating the operation permitted area.

The control device 14 of this modification includes a plurality of the area calculating units 40. When the pieces of information indicating the operation permitted area calculated respectively by the plurality of area calculating units 40 are equal, then the attitude and angular range calculating unit 34 calculates the range of rotational angle of the motor 20 of the selected joint 22 by using the calculated information indicating the operation permitted area.

When the pieces of information indicating the operation permitted area calculated respectively by the plurality of area calculating units 40 differ, then the attitude and angular range calculating unit 34 does not calculate the range of rotational angle of the motor 20 of the selected joint 22, but it instructs the motor control unit 36 to prohibit driving of all motors 20 of the articulated arm 16. According to the instruction from the attitude and angular range calculating unit 34, the motor control unit 36 prohibits driving of all motors 20 of the articulated arm 16.

Further, when the pieces of information indicating the operation permitted area calculated respectively by the plurality of area calculating units 40 differ, then the attitude and angular range calculating unit 34 may calculate the range of rotational angle of the motor 20 by using information indicating an operation permitted area that is stored in the storage unit 30 in advance. This information indicating an operation permitted area is previously set to be employed in case of abnormality of the area calculating units 40. In this case, the motor control unit 36 rotates the motor 20 of the selected joint 22 for a given time within the range of rotational angle calculated by the attitude and angular range calculating unit 34.

Alternatively, when the pieces of information indicating the operation permitted area calculated respectively by the plurality of area calculating units 40 differ, then the attitude and angular range calculating unit 34 may instruct the motor control unit 36 to drive the motor 20 within a range of rotational angle of each motor 20 that is stored in the storage unit 30 in advance, without calculating the range of rotational angle of the motor 20. This range of rotational angle stored in the storage unit 30 in advance is previously set to be employed in case of abnormality of the area calculating units 40. In this case, the motor control unit 36 rotates the motor 20 of the selected joint 22 or all motors 20 of the articulated arm 16 for a given time.

According to the control device 14 of this modification, it is possible to prevent interference between the articulated arm 16 and interfering object when a problem occurs in the calculation of the information indicating the operation permitted area.

(Third Modification)

The above-described control device 14 includes the single attitude and angular range calculating unit 34 and it calculates information indicating the attitude of the robot 12 and the range of rotational angle of the motor 20. However, if the attitude and angular range calculating unit 34 calculates a wrong angular range, then interference may occur between the articulated arm 16 and interfering object. A control device 14 of this modification prevents interference between the articulated arm 16 and interfering object when a problem occurs in the calculation of the information indicating the attitude or the range of rotational angle.

The control device 14 of this modification includes a plurality of the attitude and angular range calculating units 34. When pieces of information indicating the attitude calculated respectively by the plurality of attitude and angular range calculating units 34 are equal and the ranges of rotational angle calculated respectively by the plurality of attitude and angular range calculating units 34 are equal, then the motor control unit 36 rotates the motor 20 selected by the joint selecting unit 28 for a given time within the calculated range of rotational angle.

When the pieces of information indicating the attitude calculated respectively by the plurality of attitude and angular range calculating units 34 differ, then the motor control unit 36 prohibits driving of all motors 20 of the articulated arm 16. When the ranges of rotational angle calculated respectively by the plurality of attitude and angular range calculating units 34 differ, then the motor control unit 36 prohibits driving of all motors 20 of the articulated arm 16.

When the pieces of information indicating the attitude calculated respectively by the plurality of attitude and angular range calculating units 34 differ, or when the ranges of rotational angle calculated respectively by the plurality of attitude and angular range calculating units 34 differ, then the motor control unit 36 may rotate the motor 20 of the selected joint 22, or all motors 20 of the articulated arm 16, for a given time within a range of rotational angle stored in the storage unit 30 in advance. This range of rotational angle stored in the storage unit 30 in advance is previously set to be employed in case of abnormality of the attitude and angular range calculating units 34.

According to the control device 14 of this modification, it is possible to prevent interference between the articulated arm 16 and interfering object even when a trouble occurs in the calculation of information indicating the attitude or the range of rotational angle.

(Fourth Modification)

Figure 5:
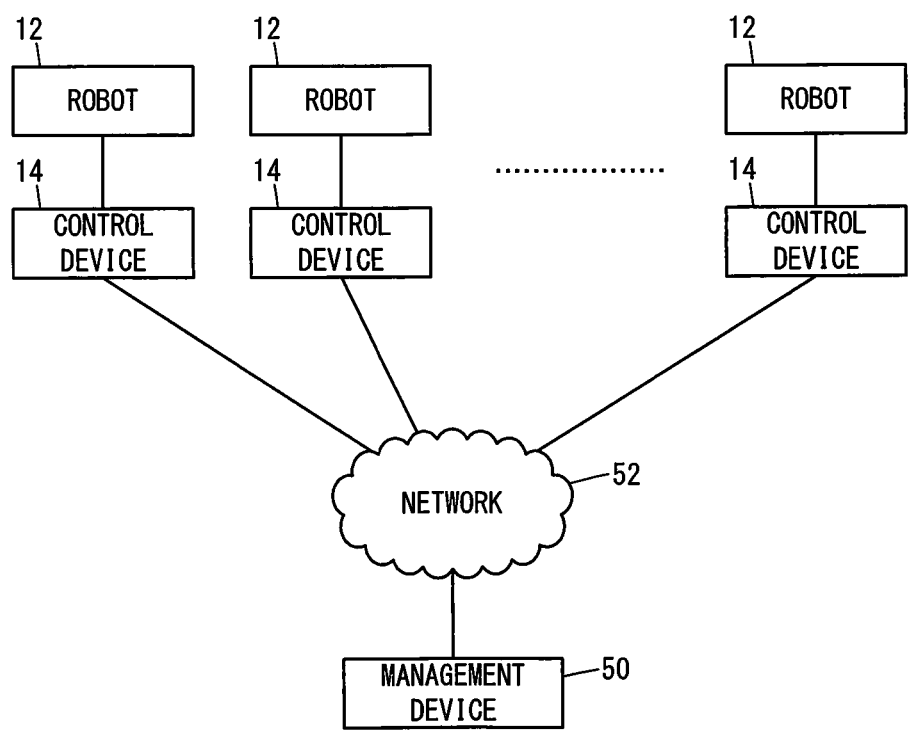
FIG. 5 is a diagram illustrating the schematic configuration of a robot control system according to a fourth modification.

FIG. 5 is a diagram illustrating the schematic configuration of a robot control system 10 according to a fourth modification. The constituent elements equivalent to those of the robot control system 10 of the embodiment above are labeled using the same reference numerals and overlapping descriptions will not be repeated.

The robot control system 10 of this modification includes a plurality of robots 12, a plurality of control devices 14, and a management device 50.

In the robot control system 10 shown in FIG. 5, one robot 12 is connected to one of the plurality of control devices 14, but a plurality of robots 12 may be connected to at least one of the plurality of control devices 14.

When a plurality of robots 12 are connected to at least one of the plurality of control devices 14, then the control device 14 to which the plurality of robots 12 are connected controls the plurality of robots 12 individually. The contents of the control for controlling the plurality of robots 12 may be common to the plurality of robots 12, or may differ for each of the plurality of robots 12.

The management device 50 is configured to manage the plurality of robots 12. The management device 50 manages the plurality of robots 12 by sending and receiving various kinds of information to and from the control devices 14 respectively connected to the plurality of robots 12 through a network 52.

The management device 50 includes the temperature information obtaining unit 24, joint specifying unit 26, joint selecting unit 28, storage unit 30, rotational position obtaining unit 32, attitude and angular range calculating unit 34, and motor control unit 36 of the above-described embodiment. The sensor group 25 of the above-described embodiment is provided on at least one side of each of the plurality of robots 12 and each of the plurality of control devices 14. A servo amplifier for driving the motor 20 according to the control by the motor control unit 36 is provided to each of the plurality of robots 12.

The temperature information obtaining unit 24, joint specifying unit 26, joint selecting unit 28, storage unit 30, rotational position obtaining unit 32, attitude and angular range calculating unit 34, and motor control unit 36 will be only briefly described here since they have already been described in detail in the embodiment.

For each of the plurality of robots 12, the temperature information obtaining unit 24 obtains temperature information on each of the plurality of joints 22. For each of the plurality of robots 12, the joint specifying unit 26 specifies a joint 22 that requires cooling based on the temperature information on each of the plurality of joints 22. For each of the plurality of robots 12, the joint selecting unit 28 calculates the degree of deterioration of the grease of each of the plurality of joints 22, and selects at least one joint 22 of the robot 12 whose grease deterioration degree is less than a reference value or is the smallest.

For each of the plurality of robots 12, the storage unit 30 stores information indicating the operation permitted area of the articulated arm 16. For each of the plurality of robots 12, the rotational position obtaining unit 32 obtains information indicating the rotational position of each motor 20 for turning the plurality of joints 22 of the articulated arm 16.

The attitude and angular range calculating unit 34 calculates the range of rotational angle of the motor 20 of at least one joint 22 on the side of the base 18 from the joint 22 of the robot 12 that was specified by the joint specifying unit 26. Specifically, the attitude and angular range calculating unit 34 calculates the range of rotational angle based on the information indicating the attitude of the articulated arm 16 of the robot 12 specified by the joint specifying unit 26 and the information indicating the operation permitted area of that articulated arm 16.

For each of the plurality of robots 12, the motor control unit 36 controls the motor 20 of each of the plurality of joints 22 through the servo amplifier. When the joint specifying unit 26 specifies a joint 22 that requires cooling, the motor control unit 36 controls the motor 20 of a joint 22 located on the side of the base 18 from the specified joint 22 of the robot 12 to turn the joint 22 on the base 18 side for a given time.

In this way, in the robot control system 10 of the fourth modification, for each of the plurality of robots 12, the management device 50 turns a joint 22 on the base 18 side from the joint 22 requiring cooling, among the joints 22 of the articulated arm 16, making it possible to collectively suppress the deterioration of grease in the plurality of robots 12. Further, it is also possible to collectively manage, for each of the plurality of robots 12, information as to joints 22 that tend to frequently require cooling, information about the ranges of rotational angle of the motors 20 for rotating the joints 22 to cool the joints 22 that require cooling, and so on.

(Fifth Modification)

Figure 6:
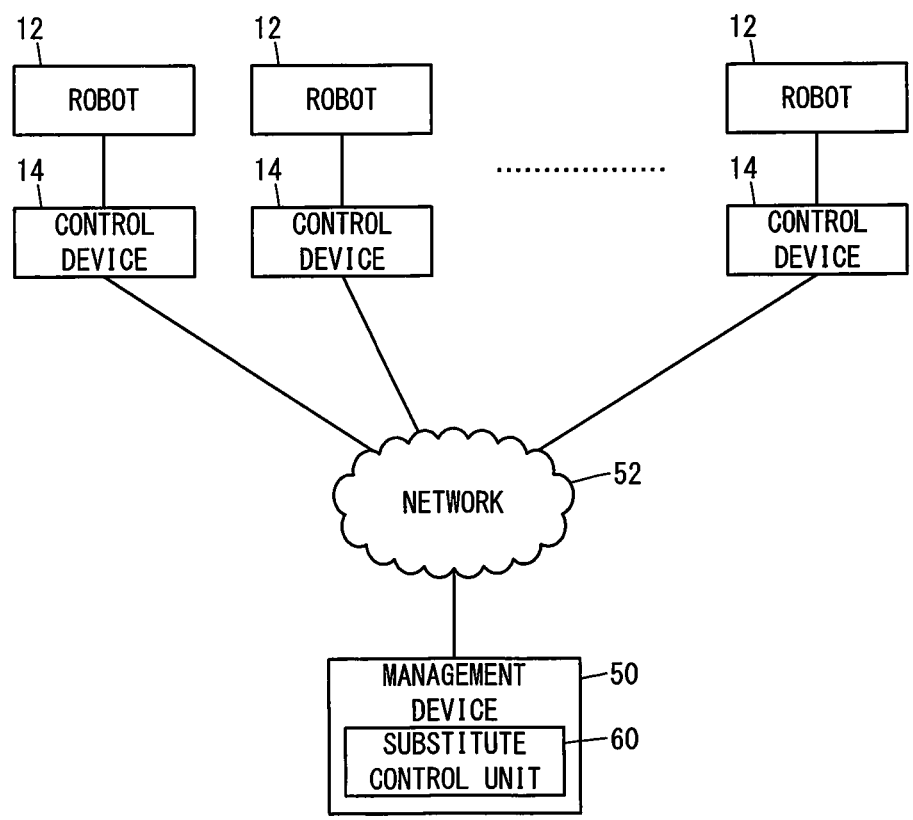
FIG. 6 is a diagram illustrating the schematic configuration of a robot control system according to a fifth modification.

FIG. 6 is a diagram illustrating the schematic configuration of a robot control system 10 according to a fifth modification. The constituent elements equivalent to those of the robot control system 10 of the fourth modification are labeled using the same reference numerals and overlapping descriptions will not be repeated.

A management device 50 of the robot control system 10 of the fifth modification includes a substitute control unit 60, in addition to the temperature information obtaining unit 24, joint specifying unit 26, joint selecting unit 28, storage unit 30, rotational position obtaining unit 32, attitude and angular range calculating unit 34, and motor control unit 36.

The substitute control unit 60 is configured to provide a control such that a work assigned to a robot 12 in which a joint 22 is being turned by the motor control unit 36 is performed by another robot 12 in which the joints 22 are not being turned by the motor control unit 36, where the substitute control unit 60 controls that other robot 12. The work can be spot welding etc., for example.

When a joint 22 that requires cooling is specified by the joint specifying unit 26 (the robot 12 having that joint 22 is hereinafter referred to as a particular robot 12), the substitute control unit 60 reads, out of the particular robot 12, a program for executing the work assigned to the particular robot 12 having that joint 22.

Further, when the joint specifying unit 26 specifies the joint 22 that requires cooling, the substitute control unit 60 determines which of other robots 12 should perform the work assigned to the particular robot 12. The substituted other robot 12 may be a robot 12 at a standstill, or may be a robot 12 in operation, as long as it is a robot 12 other than the robot 12 being in the cooling operation. The robot 12 in the cooling operation means a robot 12 in which a joint 22 on the side of the base 18 from the joint 22 requiring cooling is being turned.

The substitute control unit 60 outputs the program read from the particular robot 12 to that other robot 12 that was determined to be the robot 12 that is to perform the work assigned to that particular robot 12. Thus, on the basis of the program from the particular robot 12, the other robot 12 performs the work assigned to that particular robot 12.

In this way, the substitute control unit 60 outputs the program read from the particular robot 12 to the other robot 12 and thus controls that other robot 12 to perform the work assigned to the particular robot 12. It is thus possible to prevent delay of the work that should originally be performed during the cooling operation of the particular robot 12.

(Sixth Modification)

In the fourth or fifth modification, the management device 50 includes all of the temperature information obtaining unit 24, joint specifying unit 26, joint selecting unit 28, storage unit 30, rotational position obtaining unit 32, attitude and angular range calculating unit 34, and motor control unit 36. However, each of the control devices 14 connected to the plurality of robots 12 may include some of the temperature information obtaining unit 24, joint specifying unit 26, joint selecting unit 28, storage unit 30, rotational position obtaining unit 32, attitude and angular range calculating unit 34, and motor control unit 36. Further, in the fifth modification, the management device 50 includes the substitute control unit 60. However, each of the control devices 14 connected to the plurality of robots 12 may include the substitute control unit 60.

Further, one of the plurality of robots 12 may function as a management device 50. In this case, the control device 14 connected to the one robot 12 functioning as the management device 50 includes the temperature information obtaining unit 24, joint specifying unit 26, joint selecting unit 28, storage unit 30, rotational position obtaining unit 32, attitude and angular range calculating unit 34, motor control unit 36, and substitute control unit 60. A servo amplifier for driving the motor 20 according to a control by the motor control unit 36 is provided to each of the plurality of robots 12.

(Seventh Modification)

In the fourth or fifth modification, one control device 14 is directly connected to one robot 12. However, one control device (hereinafter referred to as a general supervision control device) 14 may be connected to a plurality of robots 12 through a network 52. The general supervision control device 14 controls the plurality of robots 12 individually through the network 52.

As mentioned earlier, the contents of control for controlling each of the plurality of robots 12 may be common to the plurality of robots 12, or may differ for each of the plurality of robots 12. The general supervision control device 14 may be incorporated in the management device 50, or may be provided separately from the management device 50. However, a servo amplifier for driving the motor 20 according to the control of the motor control unit (36) of the management device (50) is provided to each of the plurality of robots (12).

[Technical Ideas Obtained from Embodiments]

Technical ideas that can be grasped from the embodiments above will be recited below.

<First Technical Idea>

A control device (14) is configured to control a robot (12) including an articulated arm (16) having a plurality of joints (22) each provided with a motor (20) and turned by driving of the motor (20), and a base (18) supporting the articulated arm (16). The control device (14) includes: a temperature information obtaining unit (24) configured to obtain temperature information about each of the plurality of joints (22); a joint specifying unit (26) configured to specify one of the joints (22) that requires cooling, based on the obtained temperature information about each of the plurality of joints (22); and a motor control unit (36) configured to control the motor (20) of each of the plurality of joints (22), wherein, when the joint specifying unit (26) specifies one of the joints (22), the motor control unit (36) is configured to control the motor (20) of at least one of the joints (22) that is located on a side of the base (18) from the specified joint (22) so as to turn the joint (22) on the side of the base (18) from the specified joint (22) for a given time.

Thus, a joint (22) closer to the base (18) from the high-temperature joint (22) is turned to air the high-temperature joint (22) so as to cool the grease included in that joint (22) and thereby suppress deterioration of the grease, without a cooling device or the like provided to each of the plurality of joints (22).

The temperature information may be information indicating temperatures of the joints (22), temperatures of the motors (20), or temperatures of grease included in the joints (22). It is thus possible to more accurately specify a joint (22) including grease that requires cooling.

The temperature information may be information indicating temperatures of grease included in the joints (22), and the temperature information obtaining unit (24) may be configured to obtain the temperature information by estimating the temperatures of the grease from temperatures of the joints (22) or temperatures of the motors (20). It is thus possible to more accurately specify a joint (22) including grease that requires cooling.

The motor control unit (36) of the control device (14) may be configured to, when the joint specifying unit (26) specifies one of the joints (22), prohibit the driving of the motor (20) of the specified joint (22) for the given time. This suppresses further temperature rise of the high-temperature joint (22) and makes it possible to efficiently cool the grease included in that joint (22).

The control device (14) may further include a joint selecting unit (28) configured to calculate a degree of deterioration of grease of each of the plurality of joints (22) and select at least one of the joints (22) that has the grease whose degree of deterioration is less than a reference value, wherein the motor control unit (36) may be configured to drive the motor (20) of the selected joint (22). This suppresses deterioration of the grease of the joints (22).

The control device (14) may further include a joint selecting unit (28) configured to calculate a degree of deterioration of grease of each of the plurality of joints (22) and select at least one of the joints (22) that has the grease whose degree of deterioration is smallest, wherein the motor control unit (36) may be configured to drive the motor (20) of the selected joint (22). This suppresses deterioration of the grease of the joints (22).

The joint selecting unit (28) of the control device (14) may be configured to calculate the degree of deterioration based on at least one of an operating time and a rotational speed of each motor (20). It is thus possible to more accurately calculate the degree of deterioration of the grease.

The control device (14) may further include: a rotational position obtaining unit (32) configured to obtain information indicating rotational positions of the plurality of motors (20); and an attitude and angular range calculating unit (34) configured to calculate information indicating an attitude of the articulated arm (16) based on the rotational positions of the plurality of motors (20) and calculate a range of rotational angle of the motor (20) of the at least one of the joints (22) that is located on the side of the base (18) from the specified joint (22), based on information indicating an operation permitted area in which the articulated arm (16) is permitted to operate and the information indicating the attitude, wherein the motor control unit (36) may be configured to rotate the motor (20) of the at least one of the joints (22) located on the side of the base (18) from the specified joint (22) for the given time within the calculated range of rotational angle. It is thus possible to prevent interference between the articulated arm (16) and an interfering object.

<Second Technical Idea>

A grease cooling method is executed by a control device (14) configured to control a robot (12) including an articulated arm (16) having a plurality of joints (22) each provided with a motor (20) and turned by driving of the motor (20), and a base (18) supporting the articulated arm (16). The grease cooling method includes: a temperature information obtaining step of obtaining temperature information about each of the plurality of joints (22); a joint specifying step of specifying one of the joints (22) that requires cooling, based on the obtained temperature information about each of the plurality of joints (22); and a motor control step of, when the joint specifying step specifies one of the joints (22), controlling the motor (20) of at least one of the joints (22) that is located on a side of the base (18) from the specified joint (22) so as to turn the joint (22) on the side of the base (18) from the specified joint (22) for a given time.

Thus, a joint (22) closer to the base (18) from the high-temperature joint (22) is turned to air the high-temperature joint (22) so as to cool the grease included in that joint (22) and thereby suppress deterioration of the grease, without a cooling device or the like provided to each of the plurality of joints (22).

The temperature information may be information indicating temperatures of the joints (22), temperatures of the motors (20), or temperatures of grease included in the joints (22). It is thus possible to more accurately specify a joint (22) including grease that requires cooling.

The temperature information may be information indicating temperatures of grease included in the joints (22), and the temperature information obtaining step may obtain the temperature information by estimating the temperatures of the grease from temperatures of the joints (22) or temperatures of the motors (20). It is thus possible to more accurately specify a joint (22) including grease that requires cooling.

When the joint specifying step of the grease cooling method specifies one of the joints (22), the motor control step may prohibit the driving of the motor (20) of the specified joint (22) for the given time. This suppresses further temperature rise of the high-temperature joint (22) and makes it possible to efficiently cool the grease included in that joint (22).

The grease cooling method may further include a joint selecting step of calculating a degree of deterioration of grease of each of the plurality of joints (22) and selecting at least one of the joints (22) that has the grease whose degree of deterioration is less than a reference value, wherein the motor control step may drive the motor (20) of the selected joint (22). This suppresses deterioration of the grease of the joints (22).

The grease cooling method may further include a joint selecting step of calculating a degree of deterioration of grease of each of the plurality of joints (22) and selecting at least one of the joints (22) that has the grease whose degree of deterioration is smallest, wherein the motor control step may drive the motor (20) of the selected joint (22). This suppresses deterioration of the grease of the joints (22).

The joint selecting step of the grease cooling method may calculate the degree of deterioration based on at least one of an operating time and a rotational speed of each motor (20). It is thus possible to more accurately calculate the degree of deterioration of the grease.

<Third Technical Idea>

A management device (50) is configured to manage a plurality of robots (12) each including an articulated arm (16) having a plurality of joints (22) each provided with a motor (20) and turned by driving of the motor (20), and a base (18) supporting the articulated arm (16). The management device (50) includes: a temperature information obtaining unit (24) configured to, for each of the plurality of robots (12), obtain temperature information about each of the plurality of joints (22); a joint specifying unit (26) configured to, for each of the plurality of robots (12), specify one of the joints (22) that requires cooling, based on the obtained temperature information about each of the plurality of joints (22); and a motor control unit (36) configured to, for each of the plurality of robots (12), control the motor (20) of each of the plurality of joints (22), wherein, when the joint specifying unit (26) specifies one of the joints (22) that requires cooling, the motor control unit (36) is configured to control the motor (20) of at least one of the joints (22) of the robot (12) that is located on a side of the base (18) from the specified joint (22) so as to turn the joint (22) on the side of the base (18) from the specified joint (22) of the robot for a given time.

Thus, a joint (22) closer to the base (18) from the high-temperature joint (22) is turned to air the high-temperature joint (22) so as to cool the grease included in that joint (22) and thereby suppress deterioration of the grease, without a cooling device or the like provided to each of the plurality of joints (22) of each of the plurality of robots (12).

The temperature information may be information indicating temperatures of the joints (22), temperatures of the motors (20), or temperatures of grease included in the joints (22). It is thus possible to more accurately specify a joint (22) including grease that requires cooling.

The temperature information may be information indicating temperatures of grease included in the joints (22), and the temperature information obtaining unit (24) may be configured to obtain the temperature information by estimating the temperatures of the grease from temperatures of the joints (22) or temperatures of the motors (20). It is thus possible to more accurately specify a joint (22) including grease that requires cooling.

The motor control unit (36) of the management device (50) may be configured to, when the joint specifying unit (26) specifies one of the joints (22) that requires cooling, prohibit the driving of the motor (20) of the specified joint (22) of the robot (12) for the given time. This suppresses further temperature rise of the high-temperature joint (22) and makes it possible to efficiently cool the grease included in that joint (22).

The management device (50) may further include a joint selecting unit (28) configured to, for each of the plurality of robots (12), calculate a degree of deterioration of grease of each of the plurality of joints (22) and select at least one of the joints (22) of the robot (12) that has the grease whose degree of deterioration is less than a reference value, wherein the motor control unit (36) may be configured to drive the motor (20) of the selected joint (22) of the robot (12). This suppresses deterioration of the grease of the joints (22).

The management device (50) may further include a joint selecting unit (28) configured to, for each of the plurality of robots (12), calculate a degree of deterioration of grease of each of the plurality of joints (22) and select at least one of the joints (22) of the robot (12) that has the grease whose degree of deterioration is smallest, wherein the motor control unit (36) may be configured to drive the motor (20) of the selected joint (22) of the robot (12). This suppresses deterioration of the grease of the joints (22).

The joint selecting unit (28) of the management device (50) may be configured to calculate the degree of deterioration based on at least one of an operating time and a rotational speed of each motor (20). It is thus possible to more accurately calculate the degree of deterioration of the grease.

The management device (50) may further include: a rotational position obtaining unit (32) configured to, for each of the plurality of robots (12), obtain information indicating rotational positions of the plurality of motors (20); and an attitude and angular range calculating unit (34) configured to calculate information indicating an attitude of the articulated arm (16) of the specified robot (12) based on the rotational positions of the plurality of motors (20) and calculate a range of rotational angle of the motor (20) of the at least one of the joints (22) of the robot (12) that is located on the side of the base (18) from the specified joint (22), based on information indicating an operation permitted area in which the articulated arm (16) of the specified robot (12) is permitted to operate and the information indicating the attitude, wherein the motor control unit (36) may be configured to rotate the motor (20) of the at least one of the joints (22) of the robot (12) located on the side of the base (18) from the specified joint (22) for the given time within the calculated range of rotational angle. It is thus possible to prevent interference between the articulated arm (16) and an interfering object.

The management device (50) may further include a substitute control unit (60) configured to, when a work is being assigned to the robot (12) whose joint (22) is being turned by the motor control unit (36), control another of the robots (12) whose joints (22) are not being turned by the motor control unit (36) so that the other of the robots (12) performs the work instead. It is thus possible to prevent delay of the work that should originally be performed during the cooling operation of the robot (12) whose joint (22) is being turned by the motor control unit (36).

The present invention is not limited to the embodiments described above, and it goes without saying that the embodiments can be freely modified within a range that does not deviate from the essence and gist of the present invention as set forth in the appended claims.

What is claimed is:

1. A control device configured to control a robot including an articulated arm having a plurality of joints each provided with a motor and turned by driving of the motor, and a base supporting the articulated arm, the control device comprising:
- a temperature information obtaining unit configured to obtain temperature information about each of the plurality of joints;
- a joint specifying unit configured to specify one of the joints that requires cooling, based on the obtained temperature information about each of the plurality of joints;
- a joint selecting unit that selects, out of the plurality of joints, at least one joint that is closer to the base than the specified joint when there is one or more joints of the plurality of joints closer to the base than the specified joint; and
- a motor control unit configured to control the motor of each of the plurality of joints, wherein the motor control unit is configured to control the motor of the at least one selected joint so as to turn the at least one selected joint for a given time.

2. The control device according to claim 1, wherein the temperature information is information indicating temperatures of the joints, temperatures of the motors, or temperatures of grease included in the joints.

3. The control device according to claim 1, wherein the temperature information is information indicating temperatures of grease included in the joints, and
the temperature information obtaining unit is configured to obtain the temperature information by estimating the temperatures of the grease from temperatures of the joints or temperatures of the motors.

4. The control device according to claim 1, wherein the motor control unit is configured to, when the joint specifying unit specifies one of the joints, prohibit the driving of the motor of the specified joint for the given time.

5. The control device according to claim 1, further comprising a joint selecting unit configured to calculate a degree of deterioration of grease of each of the plurality of joints and select at least one of the joints that has the grease whose degree of deterioration is less than a reference value,
wherein the motor control unit is configured to drive the motor of the selected joint.

6. The control device according to claim 5, wherein the joint selecting unit is configured to calculate the degree of deterioration based on at least one of an operating time and a rotational speed of each motor.

7. The control device according to claim 1, further comprising a joint selecting unit configured to calculate a degree of deterioration of grease of each of the plurality of joints and select at least one of the joints that has the grease whose degree of deterioration is smallest,
wherein the motor control unit is configured to drive the motor of the selected joint.

8. The control device according to claim 1, further comprising:
- a rotational position obtaining unit configured to obtain information indicating rotational positions of the plurality of motors; and
- an attitude and angular range calculating unit configured to calculate information indicating an attitude of the articulated arm based on the rotational positions of the plurality of motors and calculate a range of rotational angle of the motor of the at least one of the joints that is located on the side of the base from the specified joint, based on information indicating an operation permitted area in which the articulated arm is permitted to operate and the information indicating the attitude,
wherein the motor control unit is configured to rotate the motor of the at least one of the joints located on the side of the base from the specified joint for the given time within the calculated range of rotational angle.

9. A grease cooling method executed by a control device configured to control a robot including an articulated arm having a plurality of joints each provided with a motor and turned by driving of the motor, and a base supporting the articulated arm, the method comprising:
- a temperature information obtaining step of obtaining temperature information about each of the plurality of joints;
- a joint specifying step of specifying one of the joints that requires cooling, based on the obtained temperature information about each of the plurality of joints;
- a joint selecting step of selecting, out of the plurality of joints, at least one joint that is closer to the base than the specified joint when there is one or more joints of the plurality of joints closer to the base than the specified joint; and
- a motor control step of controlling the motor of the at least one selected joint so as to turn the at least one selected joint for a given time.

10. The grease cooling method according to claim 9, wherein the temperature information is information indicating temperatures of the joints, temperatures of the motors, or temperatures of grease included in the joints.

11. The grease cooling method according to claim 9, wherein the temperature information is information indicating temperatures of grease included in the joints, and
the temperature information obtaining step obtains the temperature information by estimating the temperatures of the grease from temperatures of the joints or temperatures of the motors.

12. The grease cooling method according to claim 9, wherein, when the joint specifying step specifies one of the joints, the motor control step prohibits the driving of the motor of the specified joint for the given time.

13. The grease cooling method according to claim 9, further comprising a joint selecting step of calculating a degree of deterioration of grease of each of the plurality of joints and selecting at least one of the joints that has the grease whose degree of deterioration is less than a reference value,
wherein the motor control step drives the motor of the selected joint.

14. The grease cooling method according to claim 13, wherein the joint selecting step calculates the degree of deterioration based on at least one of an operating time and a rotational speed of each motor.

15. The grease cooling method according to claim 9, further comprising a joint selecting step of calculating a degree of deterioration of grease of each of the plurality of joints and selecting at least one of the joints that has the grease whose degree of deterioration is smallest, wherein the motor control step drives the motor of the selected joint.

16. A management device configured to manage a plurality of robots each including an articulated arm having a plurality of joints each provided with a motor and turned by driving of the motor, and a base supporting the articulated arm, the management device comprising:
- a temperature information obtaining unit configured to, for each of the plurality of robots, obtain temperature information about each of the plurality of joints;
- a joint specifying unit configured to, for each of the plurality of robots, specify one of the joints that requires cooling, based on the obtained temperature information about each of the plurality of joints;

a joint selecting unit that selects, out of the plurality of joints, at least one joint that is closer to the base than the specified joint when there is one or more joints of the plurality of joints closer to the base than the specified joint; and a motor control unit configured to, for each of the plurality of robots, control the motor of each of the plurality of joints, wherein the motor control unit is configured to control the motor of the at least one selected joint of the robot so as to turn the at least one selected joint for a given time.

17. The management device according to claim 16, wherein the temperature information is information indicating temperatures of the joints, temperatures of the motors, or temperatures of grease included in the joints.

18. The management device according to claim 16, wherein the temperature information is information indicating temperatures of grease included in the joints, and the temperature information obtaining unit is configured to obtain the temperature information by estimating the temperatures of the grease from temperatures of the joints or temperatures of the motors.

19. The management device according to claim 16, wherein the motor control unit is configured to, when the joint specifying unit specifies one of the joints that requires cooling, prohibit the driving of the motor of the specified joint of the robot for the given time.

20. The management device according to claim 16, further comprising a joint selecting unit configured to, for each of the plurality of robots, calculate a degree of deterioration of grease of each of the plurality of joints and select at least one of the joints of the robot that has the grease whose degree of deterioration is less than a reference value, wherein the motor control unit is configured to drive the motor of the selected joint of the robot.

21. The management device according to claim 20, wherein the joint selecting unit is configured to calculate the degree of deterioration based on at least one of an operating time and a rotational speed of each motor.

22. The management device according to claim 16, further comprising a joint selecting unit configured to, for each of the plurality of robots, calculate a degree of deterioration of grease of each of the plurality of joints and select at least one of the joints of the robot that has the grease whose degree of deterioration is smallest, wherein the motor control unit is configured to drive the motor of the selected joint of the robot.

23. The management device according to claim 16, further comprising:

a rotational position obtaining unit configured to, for each of the plurality of robots, obtain information indicating rotational positions of the plurality of motors; and an attitude and angular range calculating unit configured to calculate information indicating an attitude of the articulated arm of the specified robot based on the rotational positions of the plurality of motors and calculate a range of rotational angle of the motor of the at least one of the joints of the robot that is located on the side of the base from the specified joint, based on information indicating an operation permitted area in which the articulated arm of the specified robot is permitted to operate and the information indicating the attitude, wherein the motor control unit is configured to rotate the motor of the at least one of the joints of the robot located on the side of the base from the specified joint for the given time within the calculated range of rotational angle.

24. The management device according to claim 16, further comprising a substitute control unit configured to, when a work is being assigned to the robot whose joint is being turned by the motor control unit, control another of the robots whose joints are not being turned by the motor control unit so that the other of the robots performs the work instead.

* * * * *